United States Patent [19]  [11] 4,139,236
Hill et al.  [45] Feb. 13, 1979

[54] PICK-UP TRUCK

[76] Inventors: C. Lee Hill, Star Route, Port Loudon, Pa. 17224; John E. Carmack, Lemasters, Pa. 17231

[21] Appl. No.: 788,086

[22] Filed: Apr. 15, 1977

[51] Int. Cl.² .............................................. B60P 1/16
[52] U.S. Cl. ...................................... 298/14; 214/505; 293/134; 298/22 P
[58] Field of Search .................... 298/1 A, 1 R, 1 SG, 298/12, 13, 14, 15, 16, 17 SG, 22 R, 22 P; 214/505, 506; 296/28 D; 293/73, 74, 69 P, 80

[56] References Cited
U.S. PATENT DOCUMENTS

| 2,621,814 | 12/1952 | Lisota | 298/12 X |
| 2,703,658 | 3/1955 | Bazzell | 214/505 |
| 2,799,531 | 7/1957 | Vine | 298/1 R X |
| 2,990,212 | 6/1961 | Nicastro | 293/34 |
| 3,049,378 | 8/1962 | Nelson | 298/22 P X |
| 3,454,175 | 7/1969 | Kellaway | 298/12 X |
| 4,026,590 | 5/1977 | Holm | 298/1 R X |

FOREIGN PATENT DOCUMENTS

| 260213 | 5/1964 | Australia | 214/505 |
| 2139308 | 2/1973 | Fed. Rep. of Germany | 298/14 |

Primary Examiner—Frank E. Werner
Attorney, Agent, or Firm—John Howard Joynt

[57] ABSTRACT

Pick-up truck comprising a rectangular frame for hinged support at the rear of the frame of the truck, a further rectangular frame in slideable engagement with the hingedly-supported frame and having a truck bed mounted thereon, a pair of spaced hydraulic rams for tilting the first rectangular frame, another hydraulic ram for sliding the further frame and bed with respect to the first rectangular frame, and suitable hydraulic power control for selectively operating the rams.

3 Claims, 9 Drawing Figures

PICK-UP TRUCK

As a matter of introduction, our invention relates to a pick-up truck for loading, hauling and unloading a variety of goods from day to day operation, such as power lawn mowers, small air-compressors, small cement mixers, snow-mobiles, refrigerators, stoves and the like.

Among the objects of the invention is the provision of comparatively simple, inexpensive and rugged equipment for handling goods of the character described without necessity for special loading equipment, all looking toward a minimum capital investment and a savings in the required time for loading and unloading.

The invention then may be viewed as comprising a novel combination of structural elements, arrangement of parts and the interrelation between each of the same with one or more of the parts, all as described herein and illustrated in the accompanying drawings, the nature of which invention is more especially set out in the claims at the end of this specification.

BACKGROUND OF THE INVENTION

The equipment of present interest, as noted above, relates to pick-up trucks and the like. While many types of pick-up truck are on the market or are described in the prior art, virtually all require special loading apparatus or techniques. Thus many such trucks require a special loading conveyance for handling heavy loads. For others it is necessary to back up the pick-up truck to a suitable platform at elevation approximately that of the bed in order to slide or roll the load onto or off of the pick-up.

Moreover, while some of the pick-up trucks of the prior art permit some backward tilt of the truck bed to facilitate unloading, as for example the unloading of sand, gravel or the like, none seems to permit a ready loading as from the ground or roadway. On this see for example U.S. Pat. Nos. 3,833,261 of Sept. 3, 1974; 3,871,706 of Mar. 18, 1975; and 3,915,496 of Oct. 28, 1975. None provides simple, economical and easily controllable apparatus or equipment for the rapid, sure and efficient loading and unloading of a variety of different goods. All this is an object of the present invention as noted above.

SUMMARY OF THE INVENTION

According to the provisions of our invention we may use a standard pick-up truck, first removing the bed from the frame however, as by unbolting the same. Or in the event of a welded construction, we cut the bed free from the frame by suitable cutting torch. Upon the frame of the pick-up truck we mount a rectangular frame conveniently formed of channel iron, that is iron of U-shaped cross-section with the U being turned inwardly of the frame itself. This we secure to the back of the truck frame by way of suitable hinge or pivot support in order that the rectangular frame may be tilted backward as in loading or unloading.

Additionally, we provide a second rectangular frame, this conveniently of rectangular cross-section and of such dimension as to slideably fit within the side members of the first rectangular frame. On this second frame we secure the bed or load-carrying body as by bolting or welding thereto. The bed or body is provided with a tailgate suitably hinged at its bottom edge to the bed or body.

An hydraulic system with power source and suitable controls is provided for tilting the first rectangular frame upwardly and back again as desired and for sliding the second frame backward and then forward in its slideable engagement with the first frame. A pair of hydraulic rams, one on each side of the first frame, is employed to effect smooth, sensitive and balanced control of the upward tilting and then the desired lowering of the frame to the position of rest. A single hydraulic ram, axially spaced with respect to the two frames, is mounted on the first frame and actively engages the second. That ram serves to slide the second frame back and forth with respect to the first to give a smooth and exact positioning of the truck bed mounted on that frame and particularly the rear of the bed and tailgate with respect to the ground or other loading or unloading surface. Actual contact with the ground or other surface is had by way of the tailgate properly let down to accomodate the acceptance of a load and the subsequent unloading of the same.

A reservoir for hydraulic fluid along with the necessary pump, driven by motor off the electrical system of the truck, together with hydraulic valves, is conveniently mounted beneath the truck as by bolting to the truck frame. Suitable hydraulic supply lines run to both ends of each of the rams, that is to both sides of the piston in each ram. And electrical toggle switches, conveniently mounted on the cab of the truck, are provided to control the hydraulic valves for actuating the pair of tilt rams, that is the rams for tilting the one frame, and for separately actuating the slide ram, that is the ram for sliding the bed-supporting frame back and forth.

In order that the tailgate may actually reach, or closely approach, the roadway or other surface upon which the truck stands, provision is made to drop the rear bumper with which the truck is provided. The bumper is secured at its ends to a pair of plates which are pivotally mounted on upstanding supports bolted to the frame of the truck. A forwardly extending portion of each plate is pivotally linked to the tilting rectangular frame so that as the frame is tilted upwardly the linkage rotates the plates and lowers the bumper about its pivotal supports.

BRIEF DESCRIPTION OF THE DRAWINGS

Referring now to the drawings, in which there are illustrated a preferred embodiment of our invention.

Like characters figures denotes like parts throughout the several views of the drawings.

DESCRIPTION OF THE PREFERRED EMBODIMENT

Figure 1:
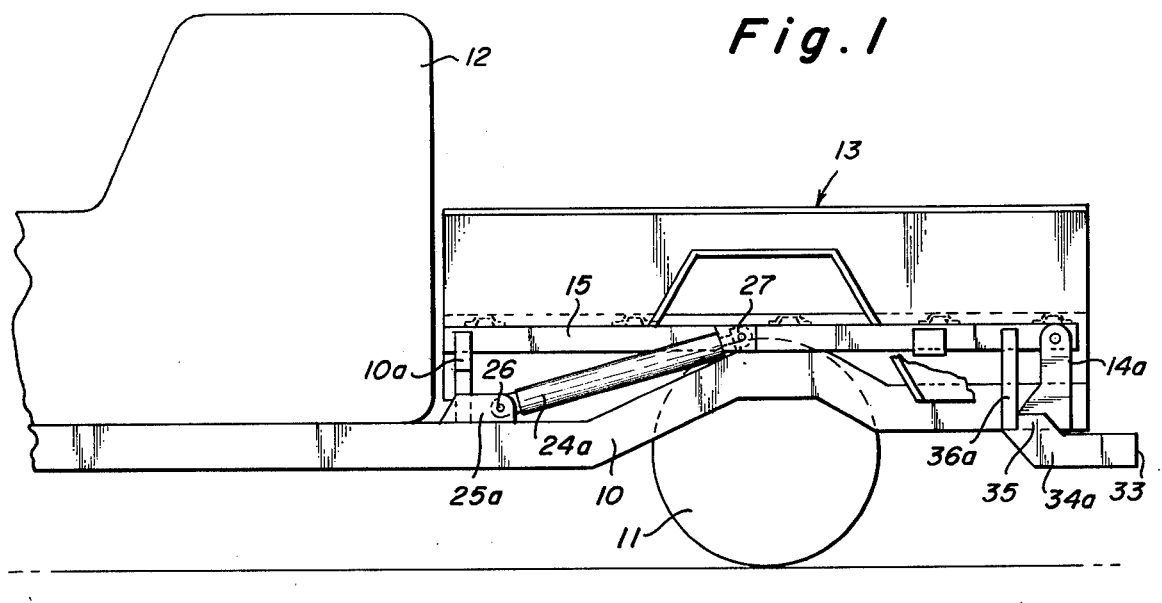
FIGS. 1, 2 and 3 respectively are side, plan and end views of a pick-up truck according to our invention, with the bed of the truck in load-transporting position.
Figure 2:
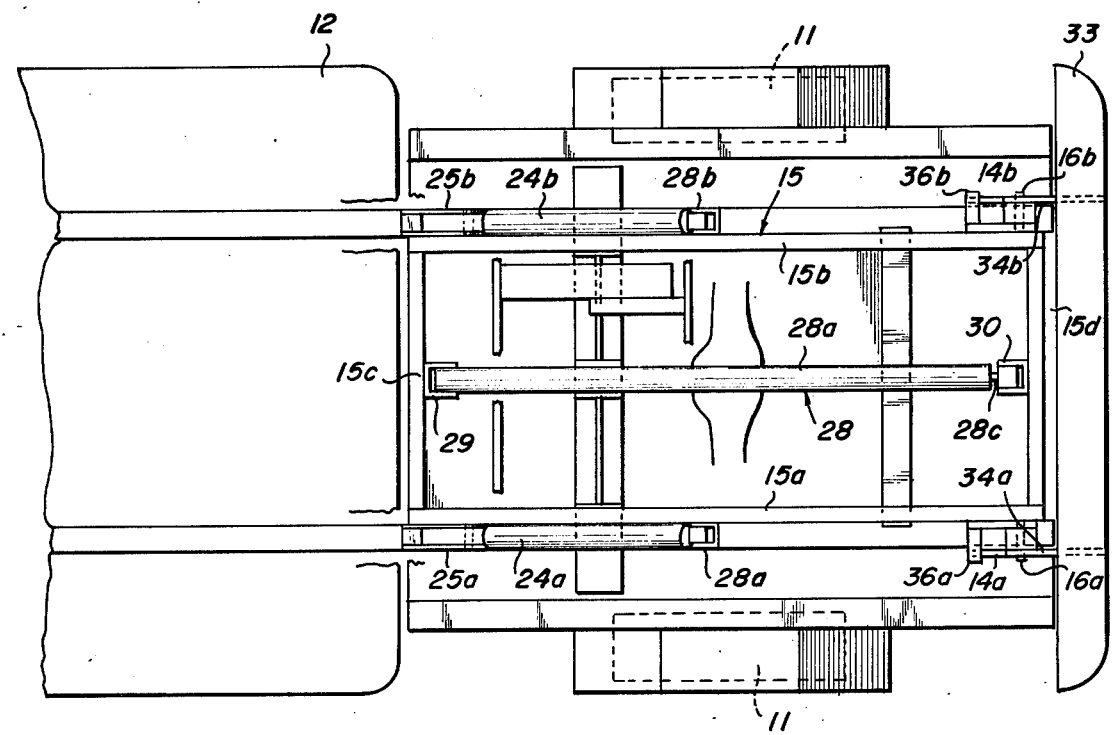
Figure 3:
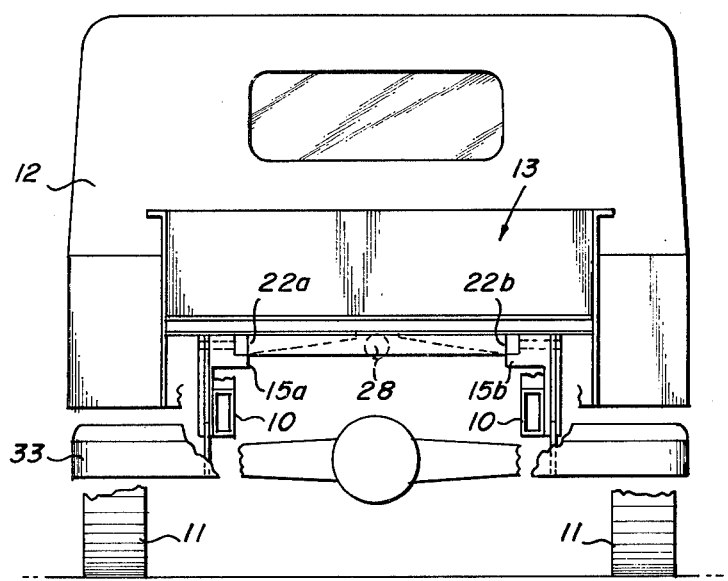

Referring now more particularly to the practice of our invention, attention is invited to FIGS. 1, 2 and 3 of the drawings, these illustrating a preferred embodiment. There we show a pick-up truck with frame 10, rear wheels 11, and cab 12. The truck bed is shown at 13.

Figure 8:
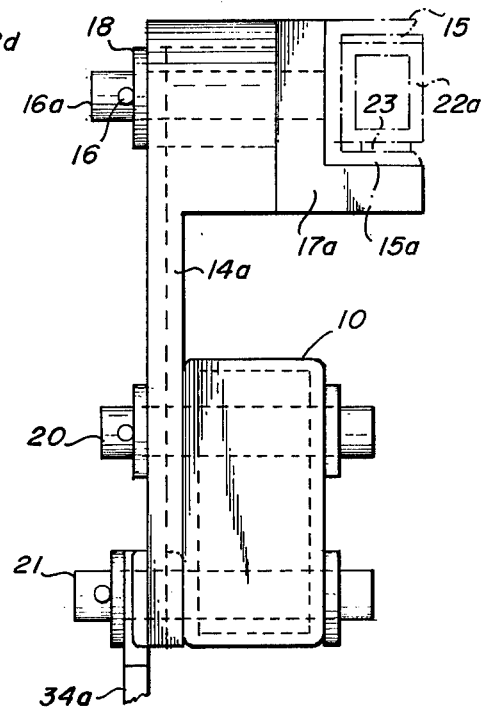
FIG. 8 is a similar detached view on enlarged scale, but in end elevation, of the linkage of FIG. 7.
Figure 9:
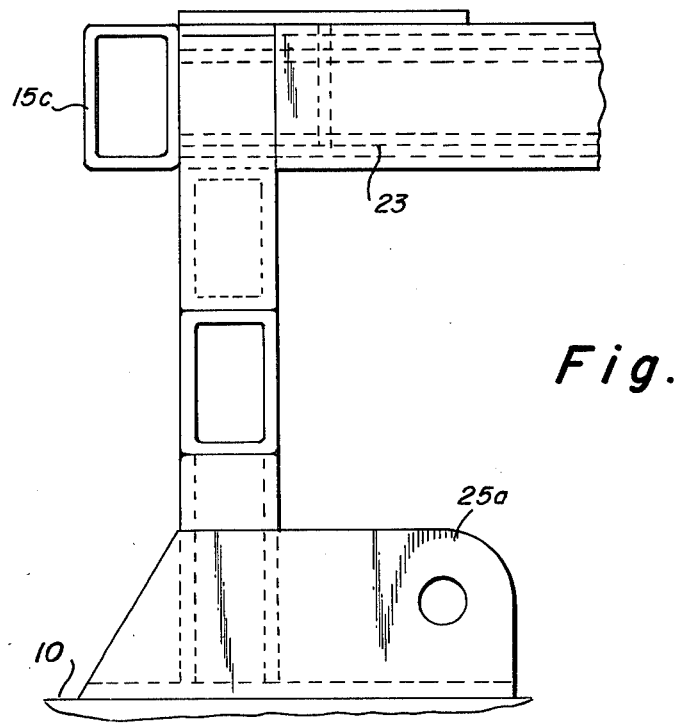
FIG. 9 is a detached view, on enlarged scale, of the front bed-supporting structure.

Mounted on frame 10 by way of spaced pivot blocks 14, is a rectangular tilt frame 15 having parallel side portions 15a and 15b of U-shaped section which face each other, head portion 15c, and foot or rear portion 15d. Tilt frame 15, conveniently fashioned of steel, is hinged secured at its rear portion 15d to the rear of truck frame 10 by way of the spaced pivot blocks 14a and 14b secured to truck frame 10 by way of pins 20 and 21 (see FIGS. 7 and 8) with associated washers and pins. These blocks respectively accomodate studs 16a and 16b secured to tilt frame 15 (see FIGS. 8 and 9) and stiffener blocks, block 17a being shown in FIG. 8. Suitable washers 18 and pins 19 serve to secure the assembly.

Slideably supported within the U-shaped side channel portions 15a and 15b of tilt frame 15, we provide a further rectangular frame 22 with opposite parallel sides 22a and 22b and fore and rear portions 22c and 22d respectively. Sides as well as fore and rear portions are fashioned of steel of rectangular section. The opposite parallel sides 22a and 22b conveniently are separated from direct contact with the sides of the tilt frame by way of anti-friction wear strips 23 (particularly see FIGS. 7 and 8).

Now tilt frame 15 is tilted upwardly and then returned to a position of rest upon pillow support 10a by way of spaced parallel hydraulic rams 24a and 24b. These rams are pivotally secured as by pins 26 to front bed supports 25a and 25b suitably secured to truck frame 10 as by bolting or welding. The opposite ends of the rams are pivotally secured to frames 15a and 15b with suitable pins 27 engaging brackets 28a and 28b secured to parallel frame sides 15a and 15b respectively by bolting or welding as desired. Rams 24a and 24b form a part of the hydraulic system more particularly dealt with below.

The slideable frame 22 is controlled in its sliding position by hydraulic ram 28 axially-mounted with fore-end pivotally secured to bracket 29 mounted on the fore-end of tilt frame 15c as by bolting or welding. The rear end of ram 29 is pivotally secured to rear bracket 30 mounted on the rear portion 22d of the slideable frame.

Tilt frame 15 and slideable frame 22, and truck bed 13 secured thereto, are controlled in their movements by an hydraulic system comprising rams 24a and 24b operating the tilt frame, and ram 28 operating the slideable frame as described above. Thus, more particularly referring to FIG. 6 of the drawings, each of the three rams contemplates an elongated cylinder with internal piston with long shaft. Illustratively, axially-mounted ram 28 employs cylinder 28a and piston 28b with elongated shaft 28c. Similarly, the parallel rams, 24a and 24b, employ cylinders 24a' and 24b' with elongated shafts 24a" and 24b". The respective mountings of the several rams as set out above are had by way of the base of the cylinders and the ends of the shafts.

Figure 6:
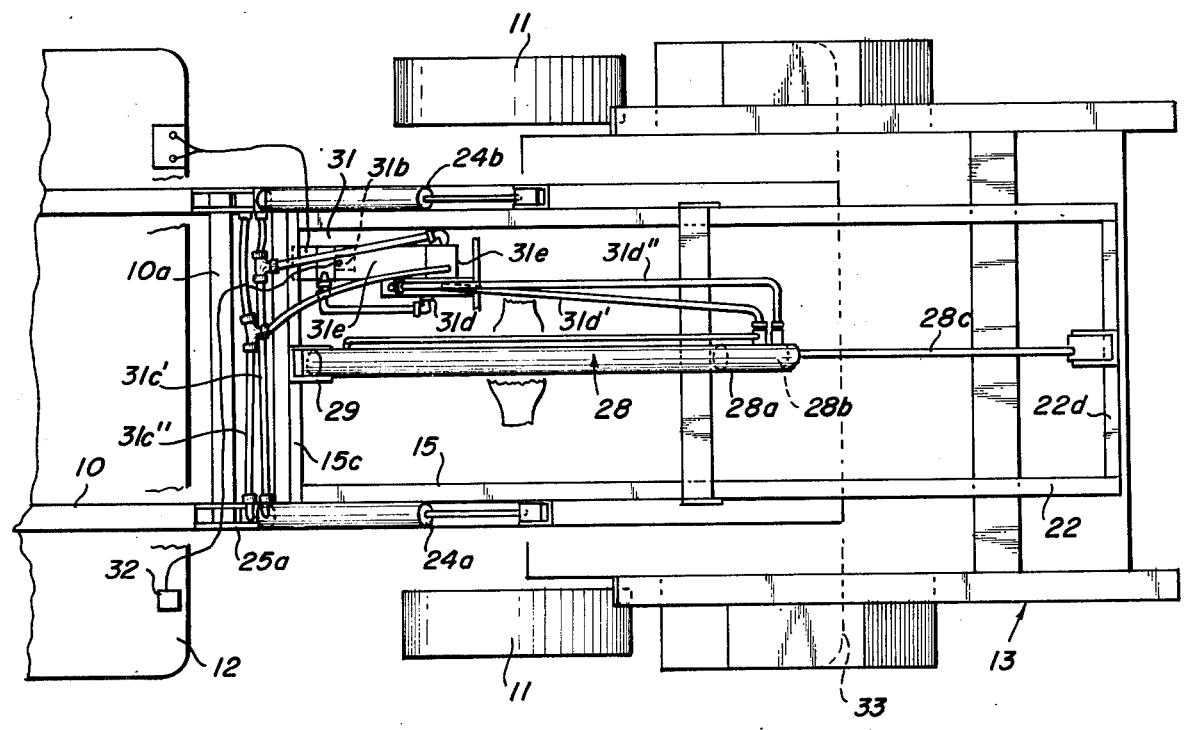
FIG. 6 is a plan view of the truck of FIG. 5 with certain parts broken away to reveal the hydraulic system employed in our invention.

Fluid under pressure from power source 31 supplies the rams (see FIG. 6). Tha source comprises an electric motor 31a, operating off the electrical system of the truck engaging an hydraulic pump 31b and acting by way of valves 31c controlling the tilt frame rams 24a and 24b through suitable conduits 31c' and 31c". Ram 28 for slideable frame 22 is controlled by valve 31 connecting with pump 31b and supply conduits 31d' and 31d". Fluid returned to the system from the several rams is accomodated by reservoir 31e.

Electrical toggle switches 32 conveniently mounted on cab 12 of the truck are manipulated by the truck driver to operate the hydraulic valves 31c and 31d for tilting the frame 15 up and down and for sliding the frame 22 back and forth, all as desired in loading and unloading the truck.

Figure 4:
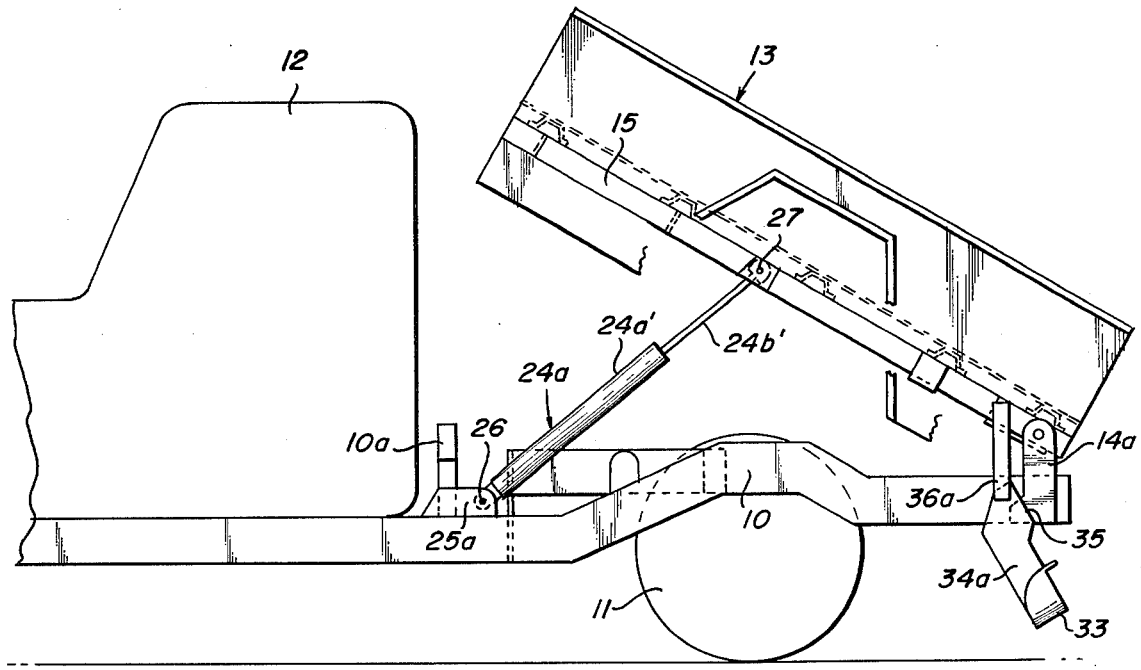
FIG. 4 is a similar side elevation view with however the bed in tilting position.
Figure 7:
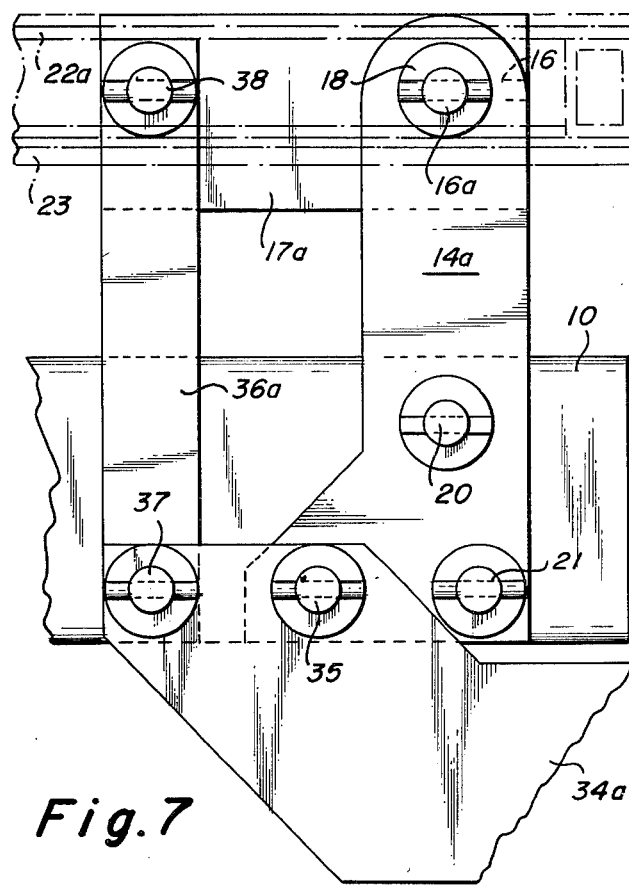
FIG. 7 is a detached view on enlarged scale and in side elevation of the truck bumper control linkage employed in our invention.

In our pick-up truck, the rear bumper 33 (see FIGS. 1, 2 and 4) is mounted on spaced parallel plates 34a and 34b, which plates are pivotally supported by way of suitable pins 35 secured to truck frame 10. Plates 34a and 34b with attached bumper 33 are swung downward (see FIG. 7), that is in a clockwise direction about pin 35, by linkage 36a and 36b. These links pivotally connect with the fore-end of plates 34a and 34b by way of suitable pins 37 and with the sides of tilt frame 15 by others. Referring to FIG. 7 it will be seen that link 36a connects with plate 34a by pin 37 and with side 15a of the tilt frame by way of pin 38.

Figure 5:
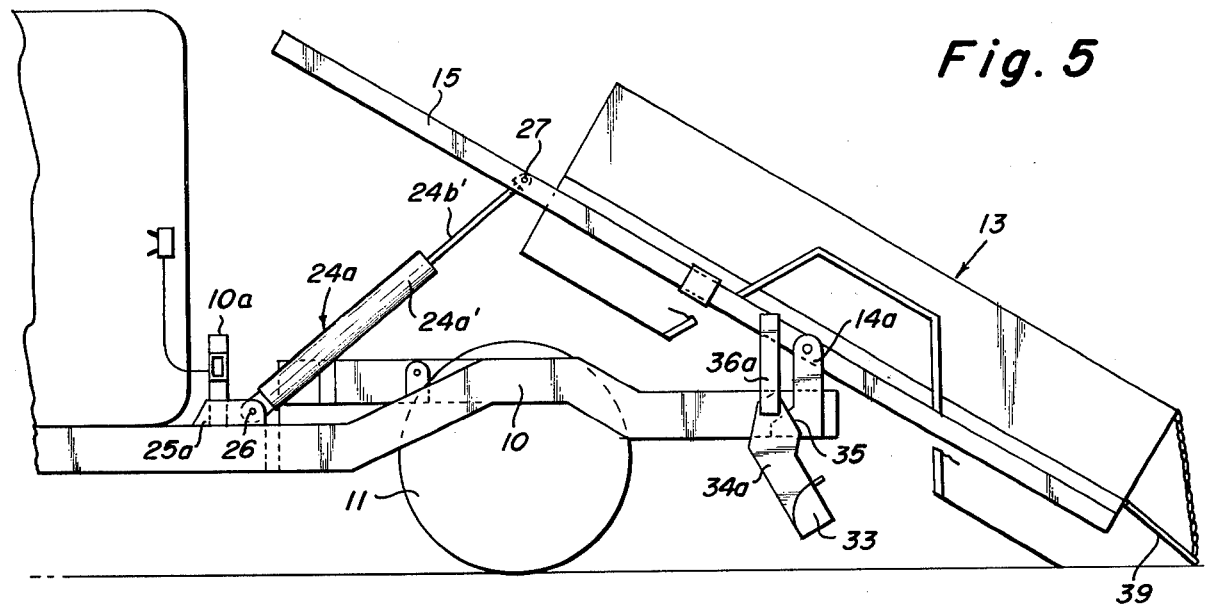
FIG. 5 also is a similar side view but with the bed in a tilted and rolled back position as for loading and unloading.

As the operator of the truck, by control of toggle switch 32, lifts tilt frame 13 about its hinged or pivotal support at the rear of the truck (see FIG. 4), this through actuation of the hydraulic rams 24a and 24b of the hydraulic system, the truck bumper 33 is rotated downwardly and out of the way. And by further control of the toggle switch the ram 28 is actuated to backwardly slide frame 22 and the truck bed 13 mounted on the frame (see FIG. 5). Tailgate 39, hingedly supported at rear of bed 13, is dropped to the ground by the operator. And the truck is then loaded as by driving onto tailgate and bed the desired load such as a power lawn mower, snowmobile, welding equipment, or rolling on further loads such as refrigerators, deep-freezers, washing machines, as noted above. The tilt frame then, by suitable control of the toggle switches, is brought down into its initial horizontal position and the slideable frame brought forward, tailgate closed and the pick-up truck is ready for transporting its load to the desired destination.

Unloading is accomplished by proper control of tilt and backward sliding of the bed while restraining the load as it is let to the ground after dropping the trailgate.

Thus, it will be seen that we provide in our invention, a simple, reliable and comparatively inexpensive piece of equipment for use in connection with the chassis of the standard pick-up truck which provides for an ease of loading and unloading through tilt and backward sliding of the bed or body of the truck, all in safe, efficient and reliable manner.

Inasmuch as many embodiments may be made of our invention and since many changes may be made in the embodiment set out above, it is to be understood that all matter described herein or shown in the accompanying drawings is to be taken as illustrative and not by way of limitation.

We claim:

1. In combination with the frame of a pick-up truck, a rectangular frame hingedly supported at the rear of the truck frame, a further rectangular frame in slideable engagement with said first-mentioned rectangular frame, a truck bed secured to said further rectangular frame, bumper means pivotally supported by spaced parallel means connecting with the rear of said pick-up frame, spaced parrallel hydraulic ram means connecting with said truck frame and said first-mentioned rectangular frame for tilting said first-mentioned rectangular frame, hydraulic ram means connecting with said first-mentioned rectangular frame and further frame axially thereof for sliding said further frame and truck bed secured thereto with respect to said first-mentioned frame, hydraulic power means for selectively operating said first-mentioned and said second-mentioned ram means, and spaced parallel linkage means secured to said spaced parallel means at the rear of said truck frame and to said first-mentioned rectangular frame forwardly of said hinged support of the same for tilting said bumper means away from possible contact with said truck bed upon a tilting of said first-mentioned rectangular frame.

2. Combination according to the claim 1 wherein the opposite sides of said first-mentioned rectangular frame are of U-shaped section and opposite sides of said second-mentioned rectangular frame in interfitting slideable engagement therewith are of rectangular section and wherein anti-friction wear strips serve to separate in slideable engagement the U-shaped section sides of said first-mentioned rectangular frame and the interfitting rectangular section sides of said second-mentioned rectangular frame.

3. Combination according to claim 1 wherein the spaced parallel means for support of the bumper means comprise plates pivotally supported on the frame of the pick-up truck at points intermediate their lengths and wherein the spaced parallel linkage means are secured thereto at the fore-ends of said plates.

* * * * *